United States Patent
Ira et al.

[11] Patent Number: 5,808,382
[45] Date of Patent: *Sep. 15, 1998

[54] LINEAR MOTOR DEVICE FOR MACHINE TOOL

[75] Inventors: Hiroshi Ira; Masayori Ito; Satoshi Kumamoto; Katsuji Gakuhari; Sanae Tashiro; Katsuhito Endo, all of Shizuoka-ken, Japan

[73] Assignee: Toshiba Kikai Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 584,209

[22] Filed: Jan. 4, 1996

[30] Foreign Application Priority Data

Jan. 11, 1995 [JP] Japan ................................. 7-002396
Jan. 12, 1995 [JP] Japan ................................. 7-003328

[51] Int. Cl.$^6$ ........................... H02K 41/00; H02K 41/02
[52] U.S. Cl. ................................. 310/12; 310/13
[58] Field of Search ................. 310/12, 13, 15, 310/19

[56] References Cited

U.S. PATENT DOCUMENTS

| | | | |
|---|---|---|---|
| Re. 27,436 | 7/1972 | Sawyer | 310/12 |
| 3,602,745 | 8/1971 | Davis | 310/13 |
| 3,706,922 | 12/1972 | Inagaki | 310/12 |
| 3,746,937 | 7/1973 | Koike | 310/13 |
| 3,869,625 | 3/1975 | Sawyer | 310/12 |
| 3,889,165 | 6/1975 | Nguyen Van | 310/12 |
| 4,344,022 | 8/1982 | Von Der Heide | 310/12 |
| 4,455,512 | 6/1984 | Cornwell et al. | 318/135 |
| 4,528,466 | 7/1985 | Von Der Heide et al. | 310/12 |
| 4,831,290 | 5/1989 | Clauss et al. | 310/12 |
| 4,965,864 | 10/1990 | Roth et al. | 310/12 |
| 5,182,481 | 1/1993 | Sakamoto | 310/13 |
| 5,270,593 | 12/1993 | Levi et al. | 310/12 |

FOREIGN PATENT DOCUMENTS

| | | |
|---|---|---|
| 3620741C2 | 11/1989 | Germany . |
| 4445283A1 | 6/1996 | Germany . |

*Primary Examiner*—Clayton E. Laballe
*Attorney, Agent, or Firm*—Finnegan, Henderson, Farabow, Garrett & Dunner, L.L.P.

[57] ABSTRACT

A linear motor device includes a primary linear motor member and a secondary linear motor member shaped of teeth of a comb with a plurality of projecting portions arranged at predetermined intervals. Recesses defined between the projecting portions are filled up with filler members for flattening a surface of the secondary linear motor member facing the primary linear motor member. Therefore, it is possible to remove chips from the surface easily. Since the filler members are made of low magnetical permeability material, the magnetic shielding between the neighboring projecting portion can be maintained. A linear motor device for a machine tool includes a bar type secondary linear motor member having both ends supported by an immovable member of the machine tool and a cylindrical primary linear motor member attached to a movable member of the machine tool. The secondary linear motor member is inserted into the primary linear motor member through a clearance so that the primary linear motor member can move in the axial direction of the secondary linear motor member. The primary linear motor member has cylindrical primary electrical wirings surrounding the whole periphery of the secondary linear motor member. An attractive force between the primary and secondary linear motor members acts over a whole periphery of the secondary linear motor member uniformly. Therefore, the resulting radial forces onto the secondary linear motor members are canceled each other.

3 Claims, 3 Drawing Sheets

LINEAR MOTOR DEVICE FOR MACHINE TOOL

BACKGROUND OF THE INVENTION

1. Technical Field

The present invention relates to a linear motor device for a machine tool and particularly, it relates to a linear motor device having a primary linear motor member and a secondary linear motor member, such as a linear pulse motor or the like.

2. Description of the Related Art

Generally speaking, the secondary linear motor member of the linear pulse motor is made of magnetic material, such as carbon steel, and shaped as it were comb teeth composed of a plurality of projecting portions. The projecting portions are arranged on one surface of the secondary linear motor member at regular intervals, opposing the primary linear motor member. In operation, the respective projecting portions are selectively subject to magnetic lines of force, which are emitted by primary windings or permanent magnets provided in the primary linear motor member. Consequently, operating as a secondary conductor, the secondary linear motor member can exert a thrust force on the primary linear motor member.

In case of adopting the so-constructed linear motor device as a linear feed unit for a machine tool, the secondary linear motor member is fixed on a bed of the machine tool, i.e., an immovable member thereof, while the primary linear motor member is attached on a lower surface of a table of the machine tool, i.e., a movable member. Note, in the secondary linear motor member, a "polar surface" in which each salient pole projects is arranged so as to face the primary linear motor member, as an upper surface of the secondary linear motor member.

In the machine tool having the above-mentioned secondary linear motor member, however, there exists a fundamental problem that chips, alien substances or the like, which have been produced during cutting a work to be processed, would drop into recesses between the respective salient poles.

Then, when the chips, the alien substances or the like have collected in the recesses in this way, the neighboring projecting portions may be shortened magnetically. In such a case, the calorific value would be increased in the secondary linear motor member thereby causing an increase of the energy loss, so that the working performance as the linear pulse motor is lowered.

Therefore, in order to measure such problems, the chips and the alien substances, etc. should be removed from the recesses of the secondary linear motor member before they collect in the recesses. However, since the linear motor device of today is provided with a great number of recesses of which each width is too small of several millimeters, a cleaning operation for removing the chips from the recesses is so burdensome that it is wasteful of time. This is a first problem to be solved by the present invention.

Next, in a machine tool, such as a planer type horizontal boring machine, a milling machine, a machining center or the like, a movable member (e.g. the above table, a spindle head, a saddle) of the machine tool is arranged so as to move linearly with respect to an immovable member (e.g. the above bed, a column, a crossbeam). The movable member is driven by a feed unit.

Hitherto, the feed unit is generally constituted by a so-called feed screw type unit which comprises a ball-screw, a ball-nut and a motor for rotating either the ball-screw or the ball-nut.

In this feed screw type unit, it is impossible to exclude feeding errors resulting from backlashes or pitch errors between reduction gears of the motor (or the ball-screw) and the ball-nut. Therefore, the feed screw type unit contains a number of feed errors components, so that it is difficult to optimize its gain in executing a feedback control.

In addition, due to a mechanism of the feed screw type unit where rotational power of the motor is converted into a linear motion by the ball-screw and the ball-nut, the feed screw type unit has a complex structure, so that friction loss thereof is large.

Because of the reasons mentioned above, it has been under consideration to drive the movable member, such as a table moving linearly, by a linear motor device directly. For example, in case of feeding a table, which is guided by linear guides so as to travel in a linear motion on a bed, by the linear motor device, a plane primary linear motor member with primary windings and a plane secondary linear motor member as a secondary conductor are arranged on a lower surface of the table and a top surface of the bed, respectively, so as to oppose to each other horizontally. Alternatively, the primary linear motor member is arranged on a vertical surface of a drooping portion provided on the lower surface of the table while the secondary linear motor member is arranged on a vertical surface of the bed so as to oppose the primary linear motor member.

Not only does the linear motor device generate a thrust force in the linear direction but also it generates magnetic vertical force perpendicular to opposing surfaces of the primary and secondary linear motor members. In case of forming the secondary linear motor members by magnetic substance, the magnetic vertical force acts between the primary linear motor member and the secondary linear motor member as an attractive force. The attractive force is so large as to be of ten times as much as a rated thrust force. Therefore, the attractive force exerts large burden to the bed and the table to which the primary and secondary linear motor members are attached respectively.

Consequently, in the above-mentioned arrangement where the primary and secondary linear motor members are arranged to oppose to each other horizontally, the table is deformed to sink inwardly, so that a flatness of the upper surface may be influenced. Further, in this case, the linear guides have to receive all of the attractive force, so that table-supporting load applied on the linear guides is increased.

On the other hand, in the above arrangement where the primary and secondary linear motor members are arranged to oppose to each other vertically, side walls of the bed are deformed inwardly, so that straightness of the linear guides arranged on upper surfaces of the side walls is deteriorated thereby to lower the accuracy in feeding the table. In addition, it should be noted that the larger a thrust force is required in a large-sized machine tool, the more remarkable the above problems become, so that the processing accuracy of the device would be lowered. This is a second problem to be solved by the present invention.

SUMMARY OF THE INVENTION

It is therefore an object of the present invention to provide a linear motor device which is capable of removing the chips, the alien substances or the like easily when they fall on the surface of the secondary linear motor member and furthermore, to provide a linear motor device which is capable of cleaning the surface automatically and stably whenever the linear motion is executed in the device.

Further, another object of the present invention is to provide a linear motor device of which structures, such as a bed, a table etc., are not subject to deformation at all even if a large attractive force due to the magnetic vertical force of the linear motor device is applied between the primary linear motor member and the secondary linear motor member and which is not only applicable for a machine tool equipped with the conventional feed-screw type unit without requiring big design changes, but also the device is capable of simplifying structures of the linear guides of the movable member.

The first object of the present invention described above can be accomplished by a linear motor device comprising:

a primary linear motor member for generating magnetic field; and a secondary linear motor member arranged to oppose the primary linear motor member, the secondary linear motor member being shaped of comb teeth and having a plurality of projecting portion arranged on a surface of the secondary linear motor member at predetermined intervals, the surface facing the primary linear motor member;

wherein recesses defined between the projecting portions are filled up with filler members made of low permeability material, whereby the surface where the projecting portions are arranged is flattened as a whole.

With the arrangement mentioned above, since the recesses between the respective projecting portions are filled up with the filler members, the whole surface of the secondary linear motor member facing the primary linear motor member can be flattened, so that it is possible to prevent chips from falling in the recesses. Furthermore, owing to the flattened surface of the secondary linear motor member, in case of using a blade-type of wiper, scraper or the like, it is possible to remove the chips from the surface at one stroke, easily and securely with the high workability. Since the filler members are made of low permeable material, the magnetic shielding between the neighboring projecting portions can be maintained stably by the filler members interposed therebetween.

In the present invention, preferably, the filler members are constituted by synthetic resinpoured into the recesses. In such a case, with the pouring operation, a manufacturing of the secondary linear motor members would be simplified.

More preferably, the primary linear motor member is provided with a cleaning wiper made of elastic material, which is arranged so as to frictionally contact with the polar surface of the secondary linear motor member. In this case, whenever the linear motor device is activated, a cleaning on the polar surface of the secondary linear motor member can be automatically carried out in a wiping manner.

According to the present invention, in order to solve the second object, there is also provided a linear motor device for a machine tool for moving a movable member with facing an immovable member linearly, the linear motor device comprising:

a bar type secondary linear motor member supported at both ends by the immovable member to extend in the direction of linear motion of the movable member; and a cylindrical primary linear motor member attached to the movable member and fitted on an outer periphery of the secondary linear motor member through play (clearance) so as to displace with facing the secondary linear motor member in an axial direction thereof, the primary linear motor member having cylindrical primary electrical wirings surrounding the whole periphery of the secondary linear motor member.

With the arrangement mentioned above, attractive force, which is caused by magnetic vertical force of the linear motor to affect between the primary linear motor member and the secondary linear motor member, acts over a whole periphery about a core axis of the secondary linear motor member uniformly or both sides of the core axis uniformly as radial forces, so that they are canceled each other.

In addition, there is also provided a linear motor device for a machine tool for moving a movable member with facing an immovable member linearly, the linear motor device comprising:

a bar type secondary linear motor member supported by the immovable member at predetermined intervals through either one of a single pedestal arranged in the axial direction of the secondary linear motor member continuously or a plurality of pedestals arranged in the axial direction of the secondary linear motor member intermittently, the secondary linear motor member extending in the direction of linear motion of the movable member; and a cylindrical primary linear motor member attached to the movable member and fitted on an outer periphery of the secondary linear motor member through play so as to displace in the axial direction of the secondary linear motor member;

wherein the primary linear motor member has a portion cooperating with the pedestal, the portion having a C-shaped cross section provided with an opening permitting the pedestal's passing therethrough; and wherein the primary linear motor member further primary electrical wiring arranged on both sides of a core axis of the secondary linear motor member symmetrically. In this case, since the secondary linear motor member is supported by the immovable member at predetermined intervals through the pedestal(s), a rigidity can be increased over all portion of the secondary linear motor member in the axial direction.

In the above invention, preferably, the primary linear motor member is provided with linear ball-bearings which engage with the secondary linear motor member. In this case, the secondary linear motor member serves as means for guiding the linear motion of the movable member, so that it can move linearly, being guided by the secondary linear motor member.

These and other objects and features of the present invention will become more fully apparent from the following description and appended claims taken in conjunction with the accompany drawing.

BRIEF DESCRIPTION ON OF THE DRAWINGS

DESCRIPTION OF THE PREFERRED EMBODIMENT

A variety of embodiments of the present invention will be described with reference to the drawings.

Figure 1:
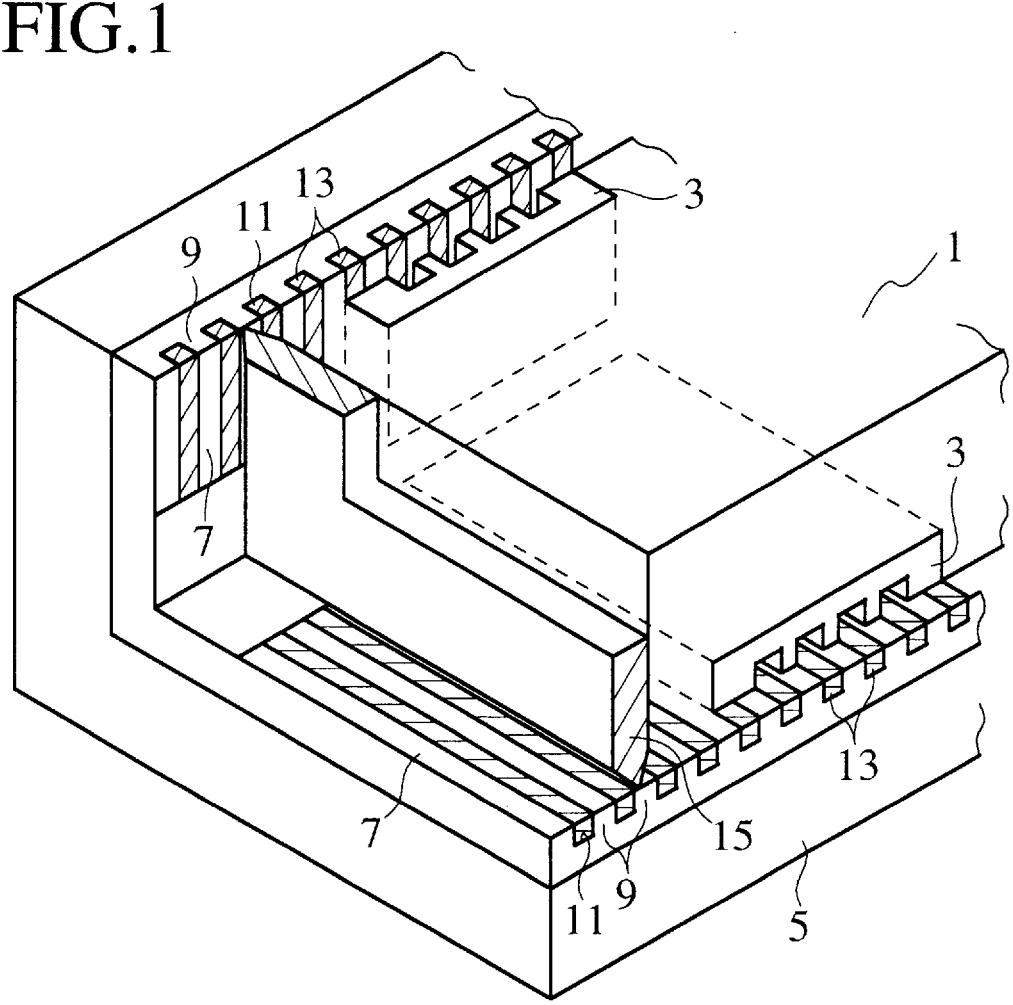
FIG. 1 is a perspective view showing a linear motor device in accordance with a first embodiment of the present invention.
Figure 2:
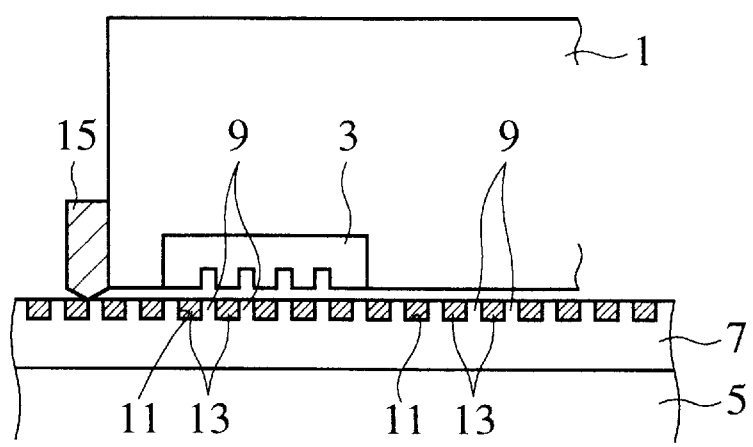
FIG. 2 is a cross sectional view of the linear motor device of 1.

FIGS. 1 and 2 shows one embodiment of a linear motor device in accordance with the present invention. The linear motor device comprises primary linear motor members 3 embedded in a table 1 and secondary linear motor members 7 mounted on a bed 5 securely.

The primary linear motor members 3 are arranged on a bottom surface and a vertical surface of the table 1 so as to oppose the secondary linear motor members 7 through predetermined clearances, respectively.

Each of the secondary linear motor members 7, which is made of magnetic material such as carbon steel, is provided on a surface thereof facing each primary linear motor member 3 with a plurality of projecting portion 9 which are arranged at regular intervals in a moving direction of the linear motor, providing a comb-teeth configuration.

Formed between the respective projecting portion 9 of the secondary linear motor member 7 are a plurality of recesses 11 each of which is filled up with a filler member 13 of low magnetic permeability, providing a surface of the secondary linear motor member 7 with a plane surface as a whole.

As materials of low magnetic permeability constituting the filler material 13, thermoplastic resin such as vinyl chloride, polyethylene, polypropylene, polystyrene, AS resin, polyamide, polycarbonate, polysulfone, polyacrylate, polyimide, fluororesin etc., thermosetting resin such as phenol resin, and ceramics may be applicable.

More preferably, the material constituting the filler member 13 may be selected from a material of which magnetic permeability is close to that of air and which exhibits high capability in mechanical strength and wear/abortion resistance with little frictional coefficient. For example, fluororesin would be applicable for the material satisfying such conditions.

Note that, in case of forming the filler member 13 besides the above materials, it may be coated with different functional material such as fluororesin or the like.

The filler members 13 may be provided by fitting parts, each of which has been molded beforehand so as to accord with a shape of the recess 11, into the recesses 11. In case of forming the members 13 by synthetic resin such as thermoplastic material, however, they may be provided by flowing the material in its fluid condition into the recesses 11, in form of so-called "insert molding". Thus, it will be understood that, in the specification, not only does the term "filling" mean the above filling operation of fluid material into the recesses 11, but it means the fitting operation of the previously molded filler members 13 into the recesses 11.

The most remarkable feature of the embodiment resides in that the filler members 13 are arranged in level with the projecting portions 9. If it is required that the filler members 13 and the projecting portions 9 are arranged in a plane more precisely, the secondary linear motor members 7 may be processed by surface grinding after filling up the recesses 11 with the filler members 13. Note, the resulting flat surfaces of the secondary linear motor members 7 where the filler members 13 and the projecting portions 11 are arranged by turns, are referred as "polar surfaces", hereinafter.

On the table 1, an elastic cleaning wiper 15 is attached so as to frictional contact with the saliency surfaces. The cleaning wiper 15 is made of rubber-elastic materials, such as isopropylane rubber, butadiene rubber, butyl rubber, nitryl butadiene rubber, multiple sulfur rubber, silicon rubber thermoplastic elastomer etc. More preferably, it is made of rubber-elastic material having high oil resistance so as not to be deteriorated by lubricating oil and high wear and abrasion resistance, such as silicon rubber, thermoplastic elastomer or the like.

As mentioned above, since the recesses 11 between the respective projecting portions 9 are filled up with the filler members 13, the whole polar surface of each secondary linear motor member 7 facing the primary linear motor member 3 can be flattened, whereby it is possible to prevent chips from falling in the recesses 11.

Furthermore, owing to the flattened polar surfaces of the secondary linear motor members 7, it is possible to remove the chips from the surfaces easily and securely with high workability by using a blade-type of wiper, scraper or the like.

Since the filler members 13 are made of material of low magnetic permeability such as synthetic resin, magnetic insulation between the neighboring projecting portion can be maintained by the filler member 13 stably, so that a provision of the filler members 13 does not lower a performance of the linear motor device.

According to the embodiment, whenever the linear motor device executes its linear movement, i.e., the table 1 is moved, the cleaning wiper 15 slides on the flatsurfaces of the secondary linear motor members 7 automatically thereby to clean them in a wiping manner. Thus, even if the chips fall on the polar surfaces, they would be removed therefrom immediately. Further, owing to the wiping function of the wiper 15, it is possible to prevent the chips from entering into the primary linear motor members 3, whereby the operational stability and reliability of the device can be improved.

Figure 3:
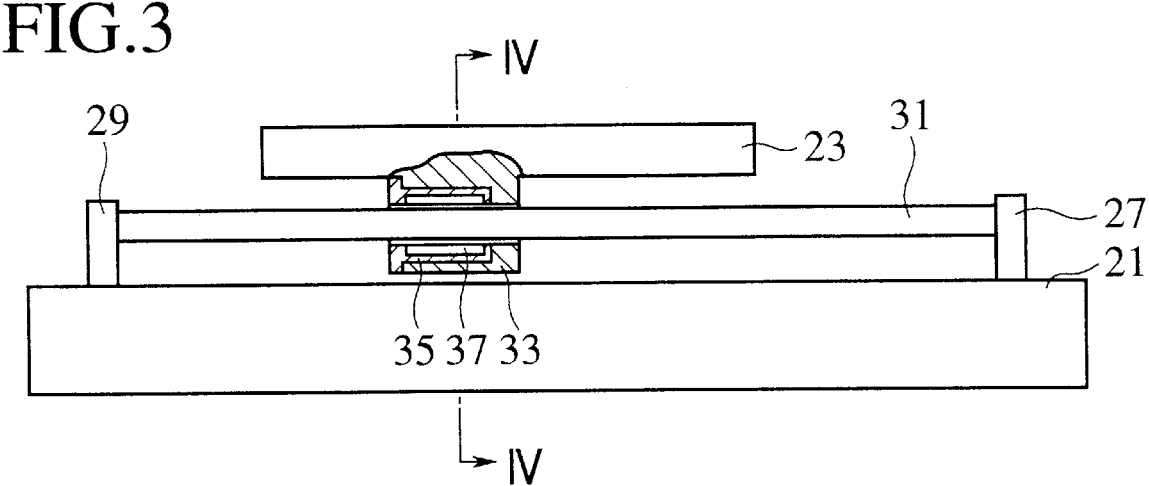
FIG. 3 is a side view showing a linear motor device for a machine tool in accordance with a second embodiment of the present invention.
Figure 4:
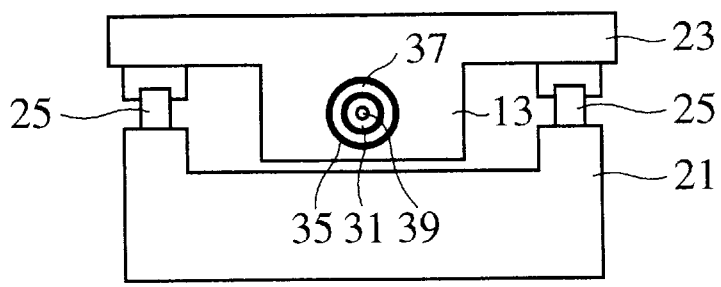
FIG. 4 is a cross sectional view of the linear motor device, take along a line of IV—IV of FIG. 3.

We now describe another embodiment of the invention with reference to FIGS. 3 and 4. In these figures, reference numeral 21 designates a bed as an immovable member and 23 a table as a movable member. Being guided by left and right linear guiding members 25 mounted on the table 21, the table 23 is adapted so as to move to right and left of FIG. 3 on a linear motion.

Fixed on the bed 21 through brackets 27, 29 is a cylindrical secondary (linear motor) member 31 which constitutes a secondary conductor of the linear motor device. In detail, the secondary linear motor member 31 of the embodiment is constituted by a hollow shaft body which has both ends supported by the brackets 27, 29 so as to extend in a linear moving direction of the table 23.

The table 23 is provided on a lower surface thereof with a drooping portion 33 to which a cylindrical primary (linear motor) member 35 is attached. The primary linear motor member 35 is arranged in coaxial with the secondary linear motor member 31 through a predetermined gap so as to displace in the axial direction of the member 31 freely. Further, the primary linear motor member 35 has cylindrical primary electrical wirings 37 surrounding a whole periphery of the secondary linear motor member 31 coaxially.

With the arrangement mentioned above, by supplying electricity to the primary electrical wirings 37, thrust in the axial direction is produced between the primary linear motor member 35 and the secondary linear motor member 31, so that the table 23 moves above the bed 21 in the left and right directions of FIG. 3 linearly.

With this generation of thrust, magnetic vertical force is also generated between the primary linear motor member 35 and the secondary linear motor member 31, whereby an attractive force is at work therebetween. Since the primary windings 37 are arranged cylindrical so as to surround the whole periphery of the secondary linear motor member 31 coaxially, the attractive force acts on the cylindrical secondary member 31 uniformly as radial forces, so that they are canceled each other.

Consequently, even if the great attractive force is applied between the primary linear motor member 35 and the secondary linear motor member 31 by the magnetic vertical force of the linear motor device, there is no possibility that a huge load of the table 23 is exerted on the linear guiding members 25 or that an eccentric load is exerted on the secondary linear motor member 31. Furthermore, there can be excluded a possibility of exerting a load on such structures of the machine tool as the bed 21, the table 23 or the like, thereby preventing the structures from being deformed.

According to the embodiment, since the secondary linear motor member 31 is simply provided on the bed 21 instead of a feed screw shaft in a feed screw device while the primary linear motor member 35 is embedded in the table 23 instead of a feed nut of the device, the linear motor device of the invention can be easily applied to the machine tool equipped with the feed screw device without requiring a substantial change in design.

In addition, since the secondary linear motor member 31 consists of a cylindrical hollow shaft, a weight of the member per se can be reduced thereby to decrease the bending caused by the member's own weight. A hollow passage 39 of the secondary linear motor member 31 is connected with a not-shown source for supplying cooling fluid, so that the linear motor device is cooled down by the cooling fluid flowing through the passage 39.

Figure 5:
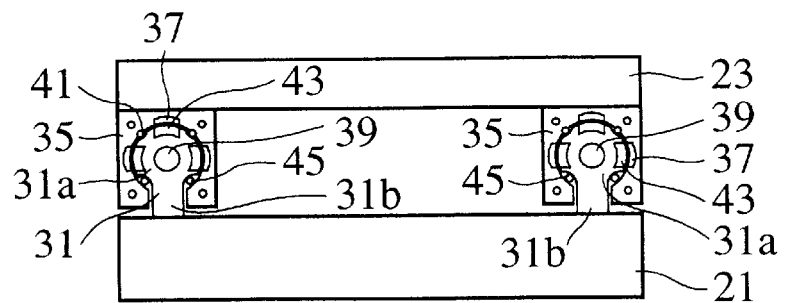
FIG. 5 is a side view showing a linear motor device for a machine too in accordance with a third embodiment of the present invention.
Figure 6:
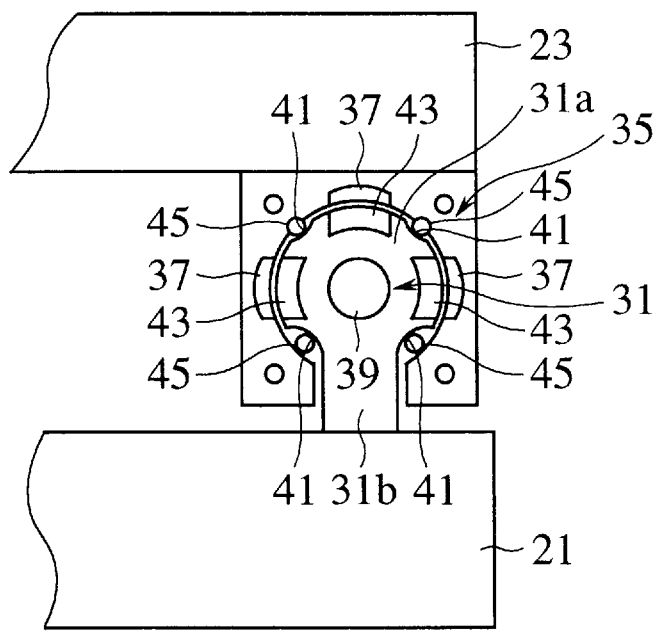
FIG. 6 is an enlarged side view showing a part of the linear motor device of FIG. 5.

FIGS. 5 and 6 show another linear motor device in accordance with a third embodiment as a modification of the above-mentioned embodiment, Note, in the figures, elements similar to those of the embodiment of FIGS. 3 and 4 are indicated with same reference numerals and descriptions of the elements will be eliminated.

According to the embodiment, two secondary linear motor members 31 are arranged on the left and right sides of the bed 21 at respective positions thereof where the linear guiding members 25 are arranged in the previous embodiment.

Each secondary linear motor member 31 consists of a hollow shaft body 31a extending in a direction perpendicular to a plane of the drawing and a pedestal 31b formed integral with the body 31a, providing a key-hole shaped cross section along the axial direction of the body 31a. The pedestal 31b is fixed to the bed 21 by means of bolts or the like (not shown) in predetermined intervals along the axial direction of the hollow shaft body 31a. Thus, the secondary linear motor members 31 are supported by the bed 21 through the intermediary of the pedestals 31b at predetermined intervals, so that the rigidity can be uniformly increased throughout the secondary linear motor members 31 in the axial direction.

Each hollow shaft body 31a is provided on an outer peripheral surface thereof with four semi-circular grooves 41 extending in the axial direction straightly. The grooves 41 are formed on the hollow shaft body 31 in the circumferential direction at intervals of an angle of 90 degrees.

The hollow shaft body 31a has a plurality of secondary conductive parts 43 formed between the semi-circular grooves 41 except a joint part of the body 31a with the pedestal 31b. In the embodiment, the secondary linear motor member 31 is provided with three secondary conductive parts 43: one is at a center of an upper surface portion of the hollow shaft body 31a and the others are on both sides of the body 31a symmetrically.

The table 23 has left and right primary linear motor members 35 attached on a lower surface on respective sides thereof. Each primary linear motor member 35 is formed so as to have a C-shaped cross section provided with an opening permitting the pedestal's passing therethrough. The primary linear motor member 35 is arranged so as to lie across the secondary linear motor member 31 through a regular gap, so that the member 35 can move in the axial direction of the primary linear motor member 31 coaxially. The primary electrical wirings 37 of the primary linear motor member 35 are arranged corresponding to the secondary conductive parts 43, respectively. Thus, the primary electrical wirings 37 are arranged on both sides of a core axis of the secondary linear motor member 31 symmetrically with each other.

The primary linear motor member 35 is provided with circulating type linear ball-bearings 45 which engage with the grooves 41, respectively. Consequently, through the ball-bearings 45, the table 23 is supported by the hollow shaft bodies 31a as "linear guide" of the secondary linear motor members 31 so as to move linearly with respect to the bed 21.

Also in the embodiment, by supplying electricity to the primary electrical wirings 37 of each primary linear motor member 35, thrust in the axial direction is produced between the primary linear motor member 35 and the secondary conductive part 43 of the secondary linear motor member 31, so that the table 23 moves above the bed 21 in the left and right directions of FIG. 3 linearly, being guided by the hollow shaft bodies 31a.

With this generation of thrust, magnetic vertical force is also generated between the primary linear motor member 35 and the secondary linear motor member 31, whereby an attractive force is at work therebetween. Since the primary electrical wirings 37 are arranged on both sides of the core axis of each secondary linear motor member 31 symmetrically, the attractive force acts on both sides of the center line of the hollow shaft body 31a uniformly as the radial force, so that they are canceled each other.

Consequently, even if the great attractive force is applied between the primary linear motor member 35 and the secondary linear motor member 31 by the magnetic vertical force of the linear motor device, there is no possibility that an eccentric load is exerted on the secondary linear motor member 31. Furthermore, there can be excluded a possibility of exerting a load on such structures of the machine tool as the bed 21, the table 23 or the like, thereby preventing the structures from being deformed.

Further, since the rigidity can be uniformly increased throughout the secondary linear motor members 31 in the axial direction, it is possible to improve the accuracy of feeding the table 23.

Note that, in a modification of the second and third embodiments, the secondary linear motor member 31 may be constructed as a sold bar member. Further, the pedestal 31b of the third embodiment may be composed of some elements arranged in the axial direction of the hollow shaft body 31a at regular intervals and similarly, the pedestal 31b may be constructed by a part which is not formed integral with the hollow shaft body 31a.

Finally, it will be understood by those skilled in the art that the foregoing description is one of preferred embodiments of the disclosed connector housing, and that various changes and modifications may be made to the present invention without departing from the spirit and scope thereof.

What is claimed is:

1. A linear feed unit for a machine tool having a linear motor device comprising:
   a primary linear motor member for generating a magnetic field, the motor member being affixed to a movable member and having an elastomeric rectangular cleaning wiper;
   a secondary linear motor member affixed to an immovable member and having a plurality of projecting portions and recesses arranged at predetermined intervals on a surface thereof, said surface of said secondary linear motor member facing said primary linear motor member and oriented to receive debris generated by movement of said primary linear motor member;
   said recesses being filled by low magnetic permeability material to form a generally planar surface with said projecting portions; and
   said elastomeric cleaning wiper being configured to frictionally engage said generally planar surface of said secondary linear motor member and remove the debris generated by movement of said primary linear motor member.

2. A linear motor device according to claim 1, wherein said low magnetic permeability material comprises a synthetic resin.

3. A linear motor device for a machine tool for linearly displacing a movable member in relation to an immovable member, said linear motor device comprising:
   a secondary linear motor member comprising a generally cylindrical body, a single pedestal, and a plurality of pedestals, the cylindrical body being affixed to said immovable member by one of said single pedestal and said plurality of pedestals, said generally cylindrical body having secondary conductive parts placed in predetermined locations around the circumference of said cylindrical body, and having a hollow coolant passage extending coaxially therewith; and
   a primary linear motor member affixed to said movable member, said primary linear motor member having a C-shaped cross section, and including primary electrical wirings at predetermined locations and ball bearings positioned on either side of said primary electrical wirings engaging said secondary linear motor member and preventing said secondary linear motor member from contacting said primary linear motor member,
   said predetermined locations of said primary electrical wirings being configured to coincide with said predetermined locations of said secondary conductive parts.

* * * * *